(12) United States Patent
Wu et al.

(10) Patent No.: US 8,755,651 B2
(45) Date of Patent: Jun. 17, 2014

(54) TUNABLE OPTICAL FILTERS WITH MULTIPLE PORTS

(75) Inventors: Ming Wu, Oak Park, CA (US); Deepak Devicharan, Horseheads, NY (US); Scott R. Dahl, Lindley, NY (US); Xuefeng Yue, San Jose, CA (US); Michael Lee Saenz, Los Altos, CA (US)

(73) Assignee: Oclaro (North America Inc.), San Jose, CA (US)

( * ) Notice: Subject to any disclaimer, the term of this patent is extended or adjusted under 35 U.S.C. 154(b) by 677 days.

(21) Appl. No.: 12/927,066

(22) Filed: Nov. 5, 2010

(65) Prior Publication Data

US 2012/0020620 A1 Jan. 26, 2012

Related U.S. Application Data

(63) Continuation-in-part of application No. 12/804,627, filed on Jul. 26, 2010, now Pat. No. 8,577,192.

(51) Int. Cl.
*G02B 6/32* (2006.01)

(52) U.S. Cl.
USPC .......................................................... 385/33

(58) Field of Classification Search
USPC .......................................................... 385/33
See application file for complete search history.

(56) References Cited

U.S. PATENT DOCUMENTS

| | | | |
|---|---|---|---|
| 4,923,270 A | 5/1990 | Carter | |
| 6,654,157 B2 | 11/2003 | Islam et al. | |
| 6,704,487 B2 | 3/2004 | Parhami et al. | |
| 6,798,551 B2 | 9/2004 | Gu | |
| 6,891,676 B2 | 5/2005 | Ford et al. | |
| 6,992,777 B2 | 1/2006 | Han et al. | |
| 7,016,098 B2 | 3/2006 | Giles et al. | |
| 7,236,660 B2 | 6/2007 | Ducellier et al. | |
| 7,340,128 B2 | 3/2008 | Shibata et al. | |
| 7,362,930 B2 | 4/2008 | Davis et al. | |
| 7,440,648 B2 | 10/2008 | Oikawa et al. | |
| 7,672,585 B2 | 3/2010 | Sone et al. | |
| 7,720,329 B2 * | 5/2010 | Presley et al. | 385/18 |
| 2001/0038730 A1 | 11/2001 | Sorin et al. | |
| 2002/0005970 A1 | 1/2002 | Lang | |

(Continued)

FOREIGN PATENT DOCUMENTS

| | | |
|---|---|---|
| CN | 1656721 A | 8/2005 |
| CN | 1831574 A | 9/2006 |

(Continued)

OTHER PUBLICATIONS

PCT/US2010/002449 International Search Report (Nov. 2, 2010).

(Continued)

*Primary Examiner* — Jerry Blevins
(74) *Attorney, Agent, or Firm* — Fenwick & West LLP (57) ABSTRACT

Described are tunable multiport optical filters that filter systems with many optical channels in a convenient and cost-effective manner. The tunable multiport optical filters of the invention are simple in design and have few optical components. The basic elements are a dispersion element and a rotating reflector. With properly arranged arrays of input and output optical fibers, individual wavelength components from a selected input beam are spatially separated and steered by the rotating reflector to selected output locations. The optical properties from the selected components may be measured by one or more photodetectors. The filters are also useful for selecting and routing optical signals.

22 Claims, 8 Drawing Sheets

(56) References Cited

U.S. PATENT DOCUMENTS

| 2004/0156581 | A1 | 8/2004 | Golub et al. |
| 2006/0228070 | A1 | 10/2006 | Davis et al. |
| 2006/0257091 | A1 | 11/2006 | Tabuchi et al. |
| 2009/0103861 | A1 | 4/2009 | Presley et al. |
| 2009/0304328 | A1 | 12/2009 | Presley et al. |
| 2010/0150563 | A1 | 6/2010 | Nakajima |
| 2012/0020617 | A1 | 1/2012 | Wu |

FOREIGN PATENT DOCUMENTS

| CN | 1996075 A | 7/2007 |
| CN | 101384933 | 3/2009 |
| CN | 202339423 U | 7/2012 |
| WO | WO 2007/078415 A2 | 7/2007 |

OTHER PUBLICATIONS

The State Intellectual Property Office of the People's Republic of China, Second Office Action, Chinese Patent Application No. 201110210059.X, Mar. 21, 2013, 15 pages.

Patent Cooperation Treaty, Written Opinion of the International Search Authority, International Patent Application No. PCT/US2010/002449, mailed Nov. 2, 2010, 6 pages.

Patent Cooperation Treaty, Written Opinion of the International Search Authority, International Patent Application No. PCT/US2011/045424, mailed Dec. 5, 2011, 9 pages.

Patent Cooperation Treaty, International Search Report, International Patent Application No. PCT/US2011/045424, mailed Dec. 5, 2011, 2 pages.

Patent Cooperation Treaty, Written Opinion of the International Search Authority, International Patent Application No. PCT/US2011/059448, mailed Apr. 4, 2012, 4 pages.

Patent Cooperation Treaty, International Search Report, International Patent Application No. PCT/US2011/059448, mailed Apr. 4, 2012, 2 pages.

The State Intellectual Property Office of the People's Republic of China, First Office Action, Chinese Patent Application No. 201110210059.X, mailed Aug. 17, 2012, 17 pages.

The United States Patent and Trademark Office, Final Rejection, U.S. Appl. No. 12/804,627, mailed Jan. 31, 2013, 16 pages.

The United States Patent and Trademark Office, Non-Final Rejection, U.S. Appl. No. 12/804,627, mailed May 11, 2012, 20 pages.

United States Patent and Trademark Office, Non-Final Rejection, U.S. Appl. No. 13/226,275, Jun. 11, 2013, 23 Pages.

\* cited by examiner

X-PLANE CROSS-SECTION

Y-PLANE CROSS-SECTION

X-PLANE CROSS-SECTION - UPPER PORT

X-PLANE CROSS-SECTION - LOWER PORT

FIG. 6

X-PLANE CROSS-SECTION

Y-PLANE CROSS-SECTION

FIG. 7

X-PLANE CROSS-SECTION

TUNABLE OPTICAL FILTERS WITH MULTIPLE PORTS

RELATED APPLICATIONS

This application is a continuation-in-part and claims the benefit of U.S. application Ser. No. 12/804,627, filed Jul. 26, 2010 now U.S. Pat. No. 8,577,192. That application is incorporated by reference herein in its entirety.

FIELD OF THE INVENTION

The field of the invention is wavelength selective devices using tunable optical filters.

BACKGROUND OF THE INVENTION

There exists a well known category of optical devices that perform optical filtering and can be tuned to select one or more narrow band of wavelengths from a wider wavelength spectrum. These devices are used in a variety of optical systems. Of specific interest are wavelength division multiplexed systems that operate typically over wavelength bands of tens of nanometers. These systems require optical performance monitoring (OPM) to ensure that signal power, signal wavelength, and/or signal to noise ratios (OSNR) are within specified limits. Other applications for tunable optical filters, inter alia, are for optical noise filtering, noise suppression, wavelength division demultiplexing, and optical routing.

Complex state of the art DWDM systems have many channels operating across a wide optical spectrum. To monitor these channels requires many measurements. Monitoring equipment that reduces the time and complexity of performing these measurements can significantly increase overall system performance and reduce system costs.

Other applications using wavelength selective devices in WDM systems are for selectively routing channels in large optical systems.

STATEMENT OF THE INVENTION

We have developed tunable multiport optical devices that perform various optical functions involving multiple optical channels in a convenient and cost-effective manner. The tunable multiport optical devices of the invention are simple in design and have few optical components. The basic elements are a wavelength dispersion element and a rotating mirror operating with arrays of input and output optical fibers. Preferred applications include optical channel monitoring (OCM), optical switches for routing optical channels between multiple optical light paths and Reconfigurable Optical Add/Drop Multiplexers (ROADM).

BRIEF DESCRIPTION OF THE DRAWING

The invention may be better understood when considered in conjunction with the drawing in which.

DETAILED DESCRIPTION OF THE INVENTION

Figure 1:
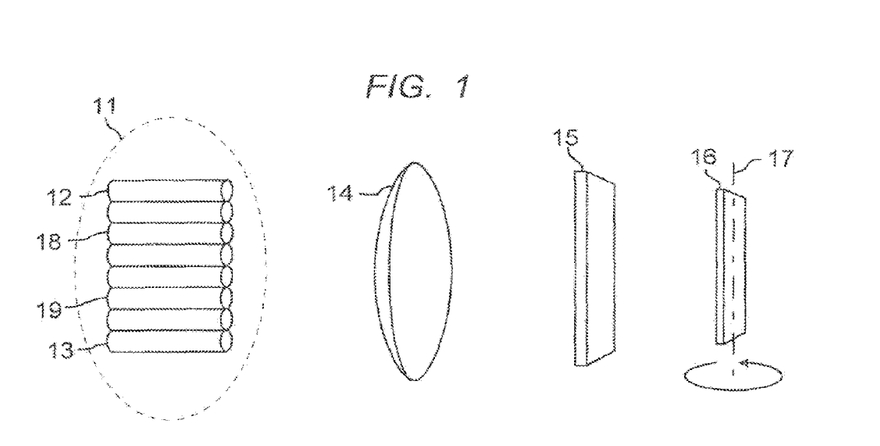
FIG. 1 is a perspective view showing a first embodiment of a tunable multi-port optical filter according to the invention.

FIG. 1 shows a first embodiment of the invention with an array of input and optical fibers shown at 11, and with collimating lens 14, dispersive element 15, and tuning mirror 16. The tuning mirror rotates around axis 17. This figure (and subsequent figures) is not drawn to scale. Optical elements are located and spaced according to their functions and properties. These are known in the art. The devices will be described using x- and y-axial notations for directions around the z-axis, which is the direction of light propagation through the device. Reference below to the x-plane or the y-plane will be understood to mean the x-z or y-z planes. Reference to x-direction or y-direction will be understood to mean directions normal to the y-z and x-z planes respectively. Reference in the figures to x-axis cross section or y-axis cross section is intended to mean a view of the x-z plane or the y-z plane respectively.

The embodiments shown are described in the context of OPM applications. However, it should be understood that the basic devices described here are also useful as wavelength selective devices for routing selected WDM channels.

Figure 2:
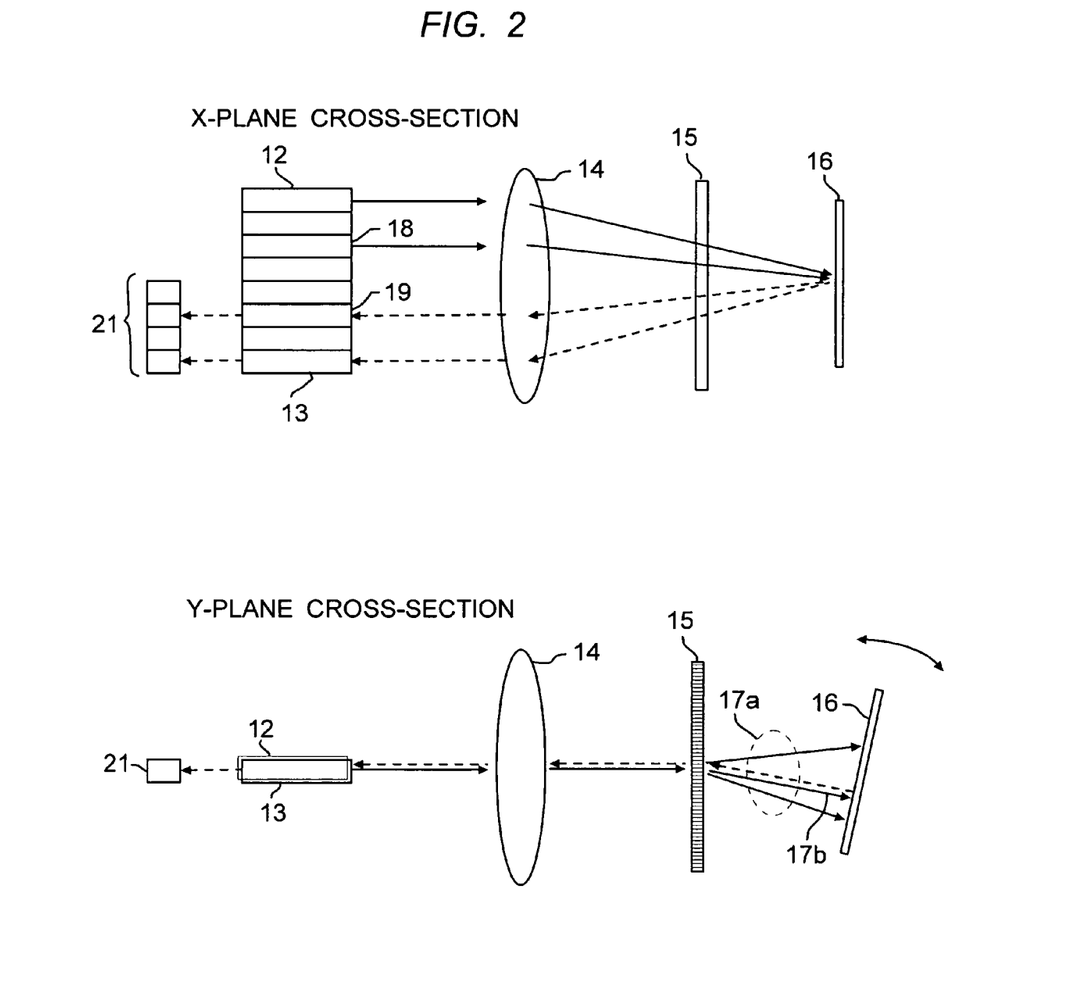
FIG. 2 is a schematic illustration the operation of the tunable multiport optical filter of FIG. 1, showing ray diagrams' for the x- and y-directions of the device.

The specific optics as represented by ray optics, for the embodiment of FIG. 1, are illustrated in FIG. 2. The input fiber array 11 is composed by 8 fibers which are tightly aligned in parallel, i.e., the optical fibers have minimal spacing and are aligned with the centers of the optical fibers on a common axis, as shown the x-axis. The signal beam to be monitored, typically a tapped portion of the signal from one channel the network, is coupled to input fiber 12. It passes through collimating lens 14 to collimate the Gaussian input beam to collimated light with suitable diameter. The collimated beam is incident onto dispersion element 15. In the x-axis cross section (top portion of FIG. 2) the beam is not dispersed. In the y-axis cross section (bottom portion of FIG. 2) the light beam from the grating is dispersed into the wavelength components of the signal beam. The wavelength components 17a are angularly dispersed from the dispersion element in different directions depending on the wavelength of the beam. A rotating mirror 16 is positioned as shown to intersect the dispersed beam. The mirror rotates on an x-axis.

The optical fibers are shown only schematically in the figures. Typically they will be standard single mode fibers with a cladding diameter of 125 microns and a core diameter of 10 microns or less. In the portion of the array shown, i.e., the portion addressed by the wavelength selection elements, the optical fibers are stripped of the usual polymer coating. This allows greater precision in the array, producing, in many cases, a predictable spacing between cores of the fibers. Recognizing that a variety of options in the format of the array may be desirable, as will be discussed in greater detail below, optical fibers with sizes other than the conventional 125 microns may be useful. For example, cladding diameters of 50, 62.5, 250, may be used to advantage to vary the overall aperture (size) of the array. It is expected that small aperture arrays may be most cost effective.

Only one of the beam components (wavelength channels), in this case components represented by arrow 17b, will be normal to the mirror 16. That beam component is reflected back along a path represented by the dashed line. Other beam components, like the two shown in the y-axis cross section of FIG. 2, will "walk-off" the mirror. The selected beam component, 17b, is dispersed by element 15 by the same angle as before and propagates to output fiber 13. The intensity of beam component 17b is measured by photodiode 21, coupled as shown to the output fiber 13. Input optical fiber 12 is shown in this view just to orient the viewer to the fact that the optical fibers in the array are stacked in the y-direction.

When mirror 16 is rotated in the y-z plane, another beam component (wavelength channel) will be normal to the mirror 16 and will be selectively reflected back through output fiber 13 and its properties measured. In this manner, the wavelength spectrum of the input beam to optical fiber 12 may be scanned and the properties of all of its beam components can be measured.

Thus the device achieves wavelength selection and provides an optical filter. The wavelength of the filter is tuned by the rotational orientation of mirror 16.

It should be noted that a similar result can be obtained if the axis of the dispersive element is rotated by 90 degrees and the mirror is tilted in the same axis that the beam is dispersed. In this configuration the light beam from the grating is dispersed into the wavelength components of the signal beam along the same axis of the fiber array, and there is some likelihood that the spectra from a fiber port will overlap with an adjacent or non-adjacent fiber port. The wavelength components which are diffracted from the dispersion element can be distinguished by increasing the separation of the fiber ports, although this will require a large optical aperture. To obtain satisfactory performance fiber port separation would be increased to three or more times larger than the separation required when the axis of the dispersive element is orthogonal to the fiber array.

It will be understood that a function of the rotating mirror 16 is to select a wavelength component of the incident beam and return it to a fixed position, in the case of the arrangement of FIG. 2, to output optical fiber 13/detector 21. An equivalent result may be achieved using a refractive beam steering element, and tilting or translating the refractive element to select a given wavelength and steer it to a fixed output/detector. A simple implementation of this is a lens or a flat or wedged transparent plate. The output/detector is this case is located on a side of the plate opposite to the input optical fiber. In this description, reference to a mirror or to a beam steering element should be construed as referring to and including equivalent structures such as those just mentioned.

It will be recognized that the optical paths in the x-axis cross section of FIG. 2 are unchanged by the tilt of mirror 16 in the y-z plane. This is due to the fact that lens 14 focuses all input beams on the axis of rotation of the mirror. The reflecting surface along the tilt axis remains essentially fixed when the mirror is tilted. The orientation of the mirror may be changed by an actuator or several actuators. The mirror may comprise a micro electro-mechanical system (MEMS), or comprise a discrete mirror driven by motors or any other types or actuators. The tilt of the mirror may be changed in one axis, or more than one axis.

Another WDM channel may be input as an input beam to optical fiber 18. The output of the beam components from this channel are directed through output optical fiber 19 and measured by the associated photodetector as shown in the top portion of FIG. 2.

It will be appreciated by those skilled in the art that, while the array of input optical fibers, e.g., 12 and 18, and the array of output fibers 13 and 19 are shown closely packed and precisely aligned, the device input optical fibers and the device output optical fibers may have any length and be routed in any suitable fashion to other components/couplers in the system. For example, the photodetectors 21 are shown as an array of elements receiving light beams directly from the closely packed array of output optical fibers. However, the optical fiber 13 may route an optical signal to a photodiode non-aligned with respect to the output array of optical fibers.

The detection device may take any of a variety of forms, and measure a variety of optical beam properties. The arrangement shown is simple and useful for illustration. If the input beams are suitably time division multiplexed, a single detection device may be used. Alternatively a single spectrum analyzer may be used as the detection device.

In this description the optical elements are shown as separate elements. These represent functional elements. The physical elements providing these functions may, in some cases, be combined as a single module. For example, a grating may have a reflective surface or an attached or integral lens.

Figure 3A:
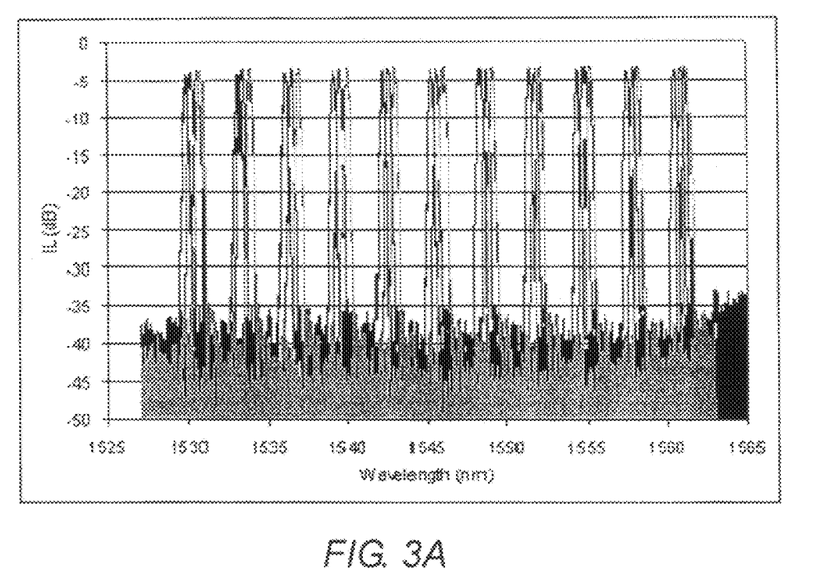
FIGS. 3A and 3B show performance data for the embodiment of FIG. 1.
Figure 3B:
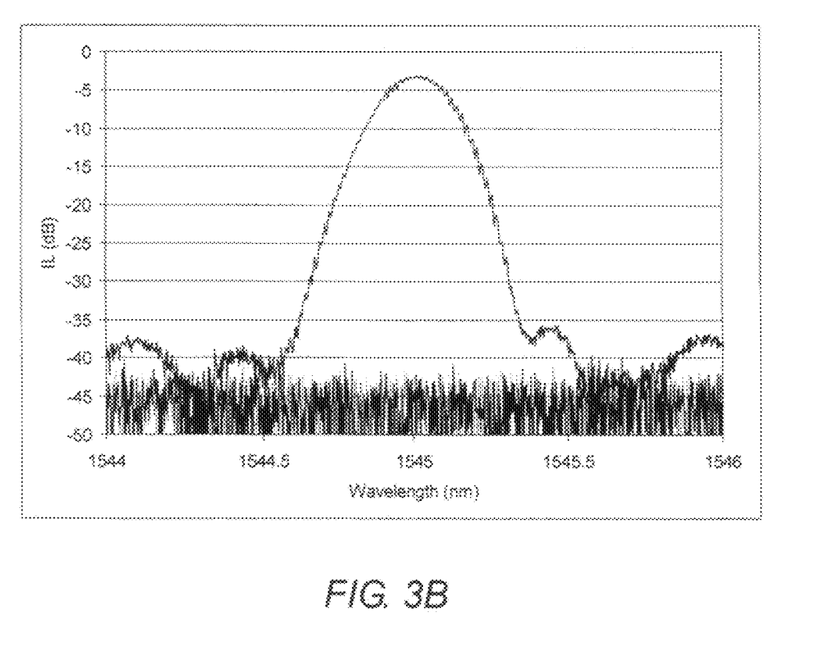

FIGS. 3A and 3B provide test results of a device built with the fiber array and optical figuration of FIGS. 1 and 2. The filter is characterized by optical spectrum analyzer (osa). The light from a broad band light source is couple to the input fiber. The output fiber is connected to the osa, and the spectrum is taken. The spectrum shows that the filter produces high transmission in a narrow band. The location of the passed band (filter wavelength) may be changed electronically as described by actuating the MEMS mirror control.

In the embodiments of FIGS. 1 and 2, the device is shown with a 1×8 fiber array, and can achieve 4 ports (4 tunable filters), in which all the ports are tuned simultaneously. In this array, all of the optical fibers are aligned in a single plane. The number of fibers may vary but typically will be an even number to produce pairs of fibers, each pair with an input fiber and an output fiber.

Figure 4A:
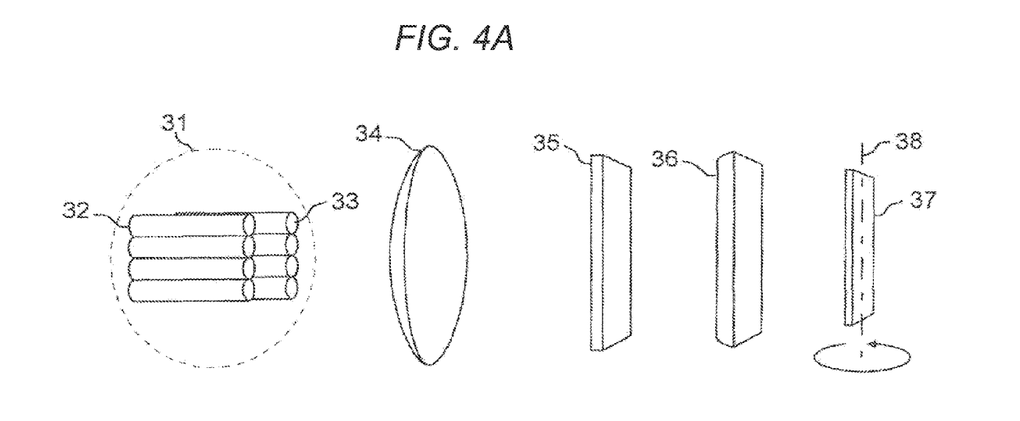
FIGS. 4A and 4B show various views of a second embodiment of a tunable multi-port optical filter according to the invention.
Figure 4B:
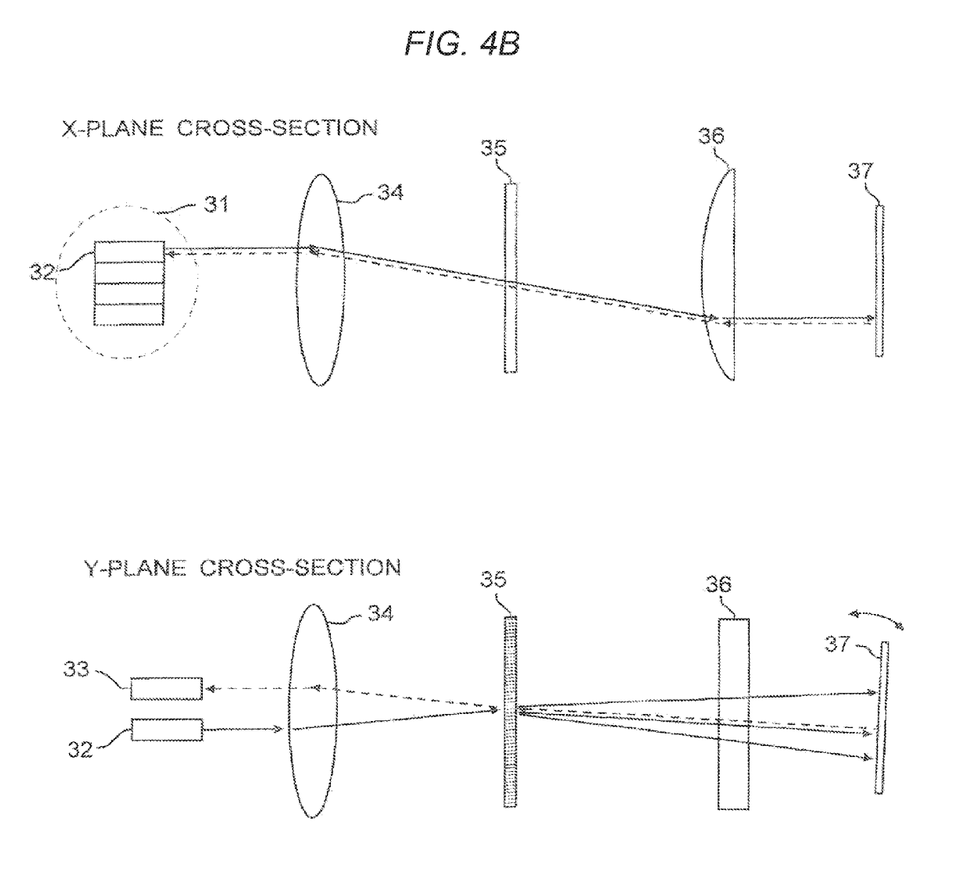

The fiber array may have other formats. FIGS. 4A and 4B, the fiber array 31 is arranged in a 2×4 format to achieve a 4-port tunable filter. FIGS. 4A and 4B also show a different optical configuration. In the system of FIGS. 4A and 4B, two lenses are used. The first, 34, is a spherical or aspherical lens used to collimate the beam in both x- and y-directions. The second lens, 36, is a cylindrical lens. It focuses the input beam from input optical fiber 32 in the y-direction but does not focus the beam in x-direction. In this optical configuration, the returning light beam returns to the associated output optical fiber 33 with same y-direction coordinates. For simplicity in the illustration the photodetectors have been omitted.

Figure 5:
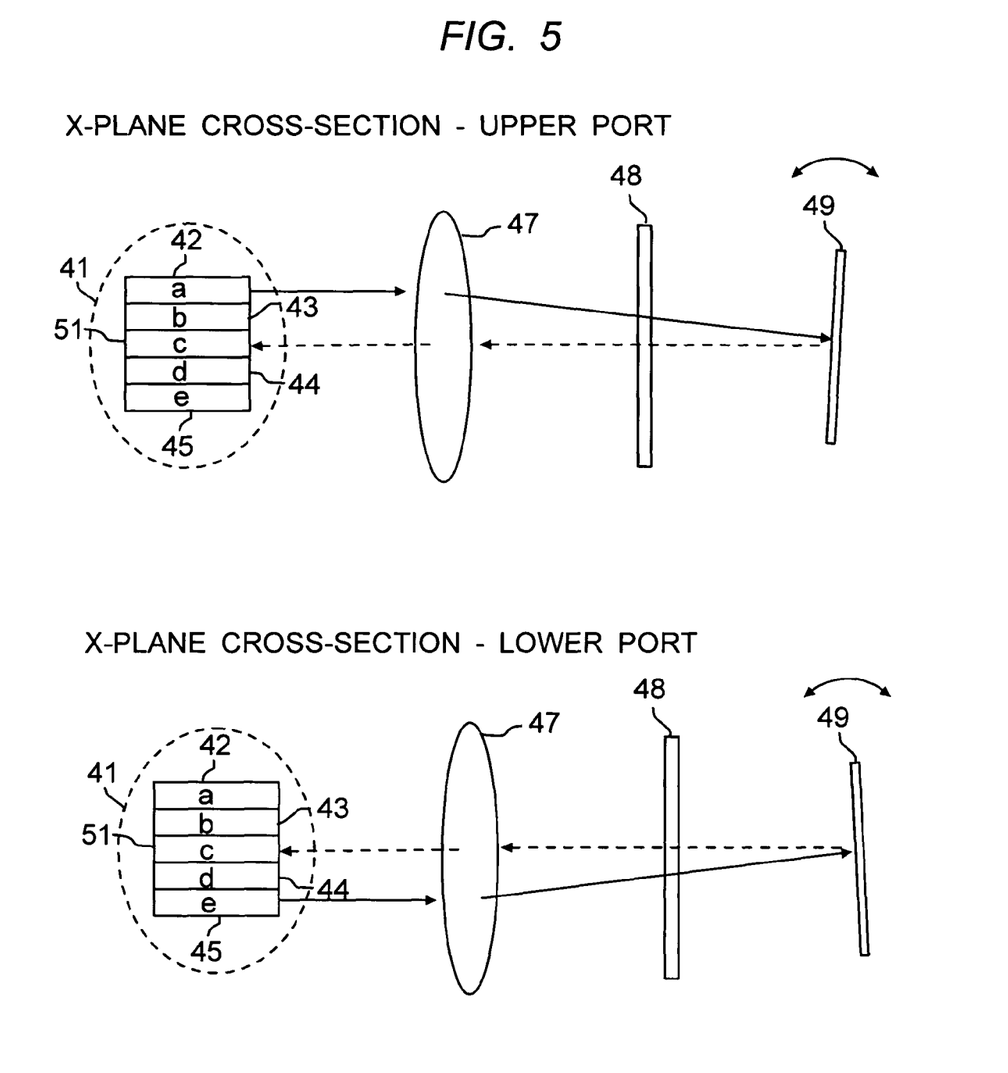
FIG. 5 is a schematic illustration similar to that of FIG. 2, showing ray diagrams for the x- and y-directions in the device of the second embodiment.

In the systems described it is not required that the ports be tuned simultaneously. If the mirror orientation can be controlled in 2 axes, i.e., both x- and y-, then the ports can be read in series, i.e., there will be one input fiber and a number of output fibers. In FIG. 5 the optics are configured similarly as in FIGS. 1 and 2. However, the fiber array 41 is a 1×4 format array. When the mirror is rotated to the first angle along x axis, light from the upper input fiber 42 is coupled back to output fiber 51. When the mirror is rotated to the second angle, shown in the lower portion of FIG. 5, light from the lower input fiber 44 is coupled back to output fiber 51. In this method, multiple outputs from different input fibers 42-45 can be read in series. Note that the mirror still rotates also along the y-axis to select the different wavelengths.

It should be evident that the number of optical fibers in a multiport optical filter according to the invention may vary widely. In embodiments like FIGS. 2 and 4 there will typically be at least three input optical fibers and three output optical fibers, producing a three port device array. In an embodiment like FIG. 5 there will preferably be at least two input optical fibers and one out put optical fiber, producing a three port device.

The light waveguides described above are optical fibers. However, other waveguide arrays may be substituted. For example, the arrays of optical waveguides may comprise optical integrated circuits (OICs) where parallel waveguides are formed in a common substrate such as lithium niobate, doped glass, or indium phoshide. The term "waveguide" used herein is intended to include any suitable light guiding element.

The placement of the optical fibers, both for the input side and the output side may vary significantly. In the embodiments of FIGS. 2 and 4, the mirror rotates around a single axis. Accordingly the optical fibers in the arrays are arranged in a single parallel plane. However, with biaxial rotation of the mirror, basically any x-y array configuration may be used.

As mentioned earlier, the devices described above may be used as wavelength selective devices in any application requiring that function. The embodiment shown in FIG. 5 for example shows four input ports and one output port. Many optical channels may be introduced into the input ports 42-45 while only a single wavelength exits at the output port 51 from any input port at one time. For this application the tilt of the reflector element 49 is adjusted in two axial orientations to pass only the channel selected for a specific input port. It then remains fixed until a different channel and port selection is needed.

The device of FIG. 5 is shown as an n×1 device, where n denotes input(s) and 1 denotes output. However, it may also be easily modified to produce a 1×n device. Therefore the recited inputs and the output may be interchanged, or multiple inputs and output can be configured to monitor or route channels as determined by the input and output fiber orientations and the rotation of the reflector element 49 in both axes.

A wide variety of applications exist for wavelength selective devices. For example, channel selectors in DWDM transmission and display require a single channel to be selected among a large number of channel options. Recognizing that the reflector element can itself provide added functionality, optical systems may be employed in which the reflector is tilted to transmit a predetermined sequence of wavelengths. These may be used in coding devices.

In the embodiments described above, the reflector is tilted with respect to the dispersive element to achieve wavelength selectivity. However, devices may be designed in which the dispersive element is moved and the reflector is fixed. Likewise other optical elements, for example, lenses, may be used to achieve the same effect. All arrangements in which some controlled predetermined movement of a dispersive element with respect to a reflector or refractive element to achieve the purpose of the invention should be considered equivalent.

As mentioned earlier, the beam steering element is preferably a light reflecting element or a light refracting element. In both cases the element is typically operated as a moving element, e.g., a MEMS mirror or the like. Optionally, the beam steering function may be provided by a non-moving element, for example, an electro-optic device. In one embodiment using an electro-optic device the beam steering element relies on changes in refractive index of an electro-optic medium. The changes in refractive index may be used to change the direction of diffraction of a light beam being analyzed or switched.

Figure 6:
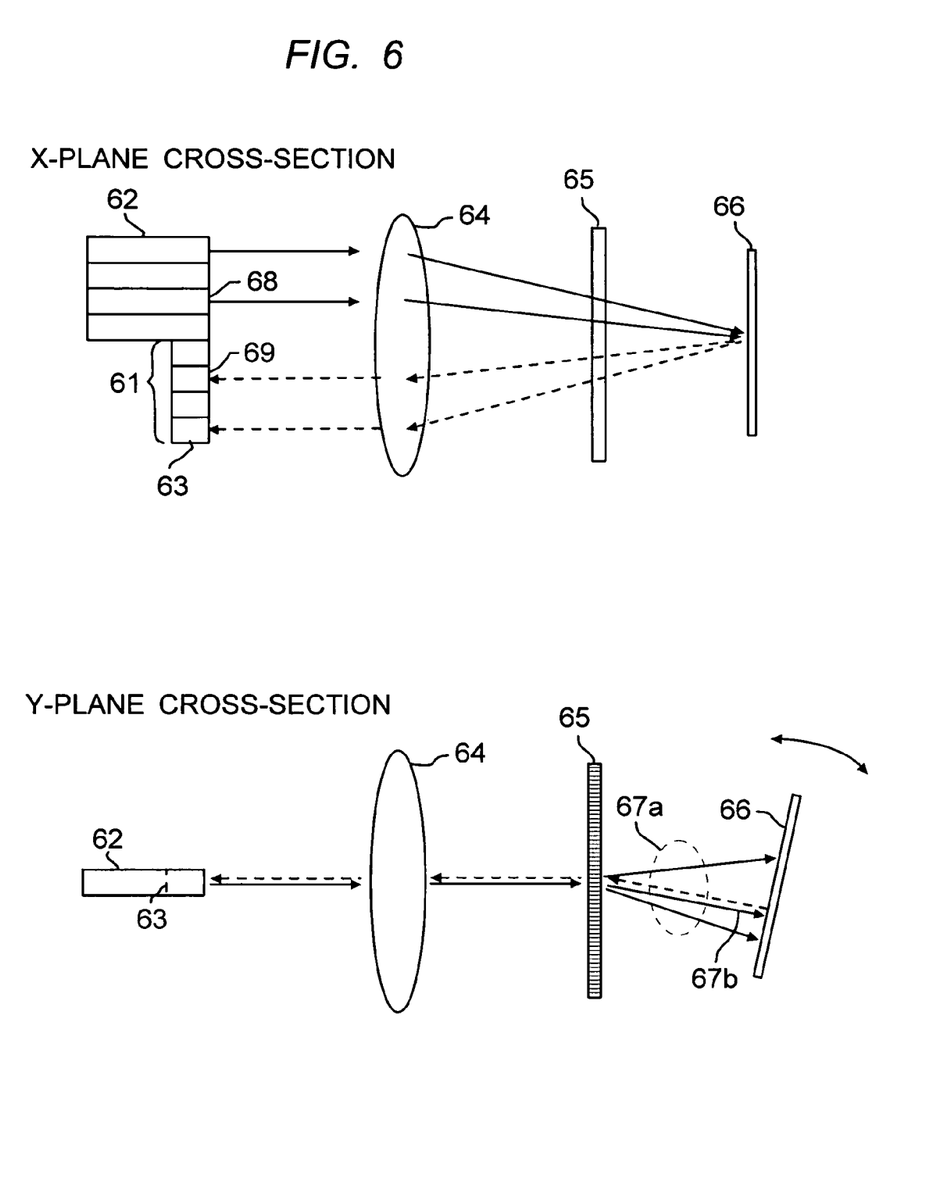
FIG. 6 is a schematic illustration similar to that of FIG. 5 showing an alternative arrangement.

FIGS. 1, 2, 4, and 5 illustrate embodiments of the invention using an input array of optical fibers, and wavelength selective beam steering means for moving light beam components to one or more selected output optical fibers in an output array. That arrangement is suitable for many of the applications anticipated for the invention, and particularly those wherein the wavelength selective mechanism of the invention is used to implement optical switching functions. In the case of an OCM device, an output optical signal may not be needed. In such case, the output optical fiber array is not required. This modification is illustrated in FIG. 6, which is a modification of FIG. 2, and reference numbers 62 to 69 are associated with elements similar to 12-19 in FIG. 2. However, the output array of optical fibers is omitted in this embodiment and the selected wavelengths are incident directly on photodetectors 63 and 69 of photodetector array 61. As in the earlier embodiment, the photodetector array may be an optical spectrum analyzer.

With reference to FIG. 5, the operation described is a 4×1 device wherein optical fibers a, b, d, and e are input optical fibers, each associated with a single output optical fiber 43. In optical switching parlance this could be described as an X by 1 device, with X inputs and 1 output. The switching operation in these devices is operated sequentially since the wavelength selection is time divided. It is important to recognize that the sequence may be other than a, b, d, and e. It may be a, c, d, b, or any other suitable sequence. It is also important to recognize that the amount of time in any one to switching configuration can be arbitrary, allowing one or more ports to be prioritized over any other. Both the switching sequence and switching time can be arbitrarily sequenced and prioritized based on the application.

Alternatively, the device shown in FIG. 5 may be operated with multiple input optical fibers and multiple output optical fibers. For example, optical fibers a, and b, may be output optical fibers, and c, d, and e, input optical fibers. This would be equivalent to two 3×1 optical switches. Preferably, the input beams for input optical fibers a and b are time divided to maintain separation between the two optical switches.

Figure 7:
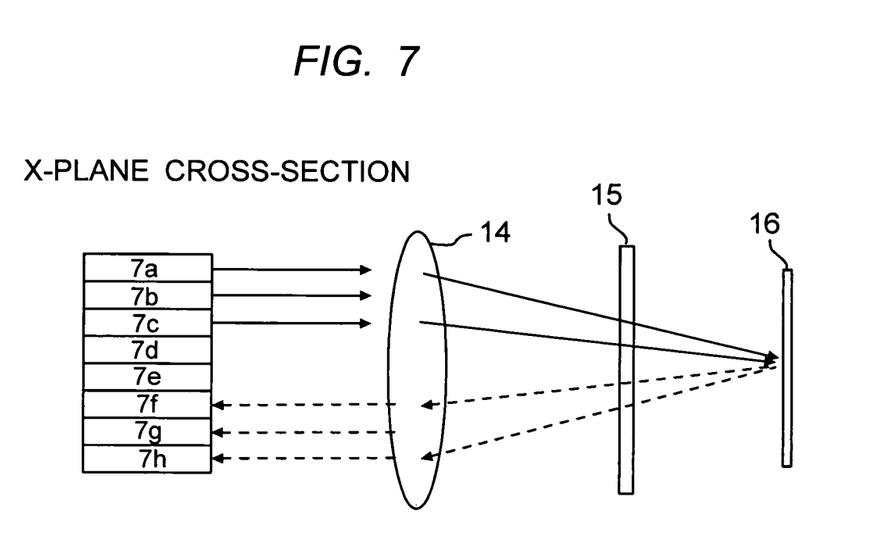
FIG. 7 illustrates an alternative approach to operating the devices described.

In another alternative embodiment the parallel readout implementation of the embodiment of FIG. 2 may be used in combination with a serial readout as in the embodiment of FIG. 5. This modification is illustrated in FIG. 7, where the optical fiber input array comprises eight optical fibers a, b, c, d, e, f, g, and h, and a corresponding optical fiber output array. Optical fibers a and b operate in the parallel mode of FIG. 2, wherein output optical fibers f and g are dedicated outputs for input fibers a and b. Optical fibers c, d, e, and f operate in the serial mode of FIG. 5, as a 3×1 optical switch. Optical fiber c is shown as the output port, and optical fibers d, e, and f, the input ports.

These embodiments illustrate the very large versatility of devices operating according to the invention that operate with a wavelength selective mirror (for example) that may be tilted around more than one axis. In the arrangement shown, the tilt around the x-axis selects the beam position, i.e., the output port, while the tilt around the y-axis selects the wavelength. The biaxial tilt allows a selected wavelength component of an input beam to be directed as an output beam to any point in the x-y plane. This gives to rise to another level of versatility in the design of devices operating according to the principles of the invention. This will be described in conjunction with the illustrations in FIGS. 8, 9, 10A and 10B.

Figure 8:
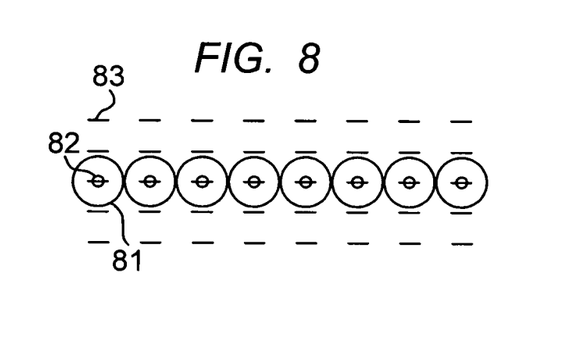
FIGS. 8, 9, 10A and 10B are views showing different output array formats useful in connection with various embodiments of the invention.

FIG. 8 shows eight output optical fibers in a linear array. The overall device includes one or more input optical fibers not shown. The device may perform any desired switching function X by Y where X may be one or more and Y may be one or more. For example, it may perform 1 by Y switching, X by 1 switching, or 2 by Y and X by 2 switching. The latter may be considered as combinations of the former.

The view in FIG. 8 is of the x-y plane in the manner of the previous figures. Each output optical fiber is shown with an optical fiber core 82, and an optical fiber cladding 81. The wavelength spectra are shown as seven bars 83 representing the output wavelengths. As described earlier, the spectra are generated by the wavelength selective elements. In FIG. 8 all eight spectrums are shown but typically in a one by n switch only one spectrum will be seen at a time. As described earlier, the rotation of the reflector (or other form of beam steering element) around the y-axis selects one of the eight output optical fibers shown. Rotation around the x-axis produces the wavelength spectrum. The wavelength spectrum in FIG. 8 is shown by five bars, with the center wavelength incident on the core of one of the output optical fibers.

While five wavelengths are illustrated in FIG. 8, there may be any number, typically more than 3. For an OCM device in a typical WDM system there may be 40, 80, 96, or more than 100 channels.

Figure 9:
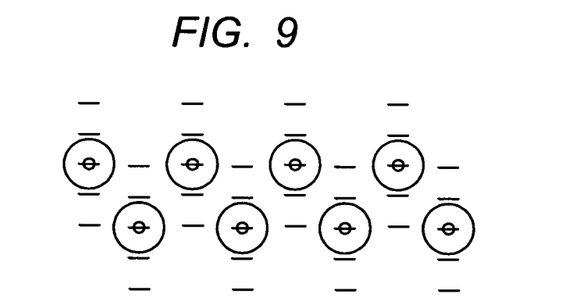

The output array in FIG. 8 is linear, with all output optical fibers located along an x-axis as shown. It is evident that the mirror that directs a chosen wavelength component to an output optical fiber/detector rotates around the x-axis through an angle sufficient to make all of the beam components incident on the output optical fiber. However, the mirror may rotate further so that the output spectrum of the wavelength selection elements may be displaced further in the y-direction. This allows output optical fibers to be located virtually anywhere in the x-y plane. This principle of operation is illustrated in FIG. 9, where four output optical fibers (the same elements as shown in FIG. 8) are located along a first x-axis, and four are located along a second x-axis, displaced from the first in the y-direction. The operation of the device may utilize suitable software for controlling the rotation of one or more of the beam selecting elements (typically the mirror) to route a selected beam component to selected output optical fiber/detector.

Figure 10A:
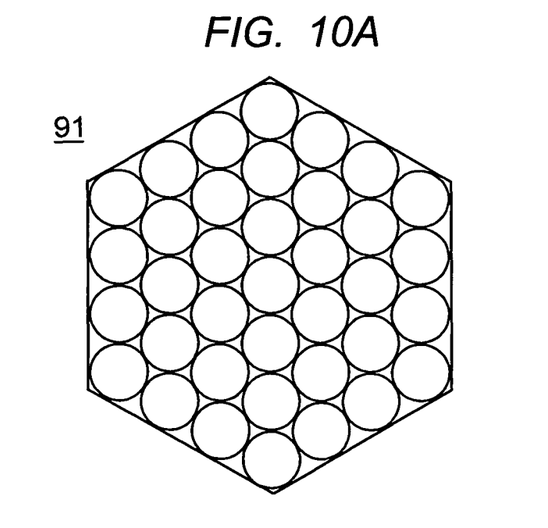
Figure 10B:
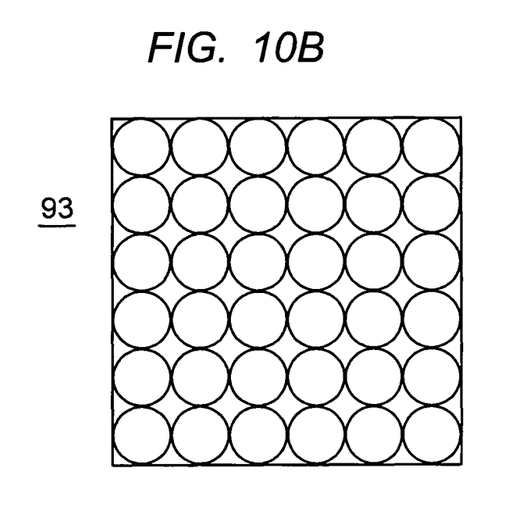

In FIG. 9, the optical fibers are shown spaced apart for clarity. In many cases it may be preferred to bundle the optical fibers in a close packed array. This allows the size of the aperture of the device to be optimized. Two such packed arrays are shown in FIGS. 10A and 10B. The array 91 in FIG. 10A has 37 optical fibers arranged in a hexagonal close-packed array for optimum packing density. To address each member of this array requires the rotation of the mirror to be changed in both axes for each address, and overall involves eight positions in the x-direction and eight positions in the y-direction. The array 93 of FIG. 10B has 36 optical fibers arranged in rows as shown. While this a more loosely packed array, the address mechanism is slightly simpler, requiring only one change in x-direction position for each six changes in y-direction. It should be evident that with biaxial capability in the beam steering mechanism any x-y position may be addressed. This includes members in an array that is randomly organized.

It is important to note that the precision of the fiber array spacing in either x or y axes does not affect the performance provided the rotation of the mirror in the x or y axes can be optimized to minimize loss. This can be facilitated through a calibration process which stores a look up table with the location of the fibers stored, or using an optimization algorithm such as a hill-climbing algorithm that seeks to minimize the loss in any optical light path.

To identify or monitor the positions of the output optical fibers in an organized or random array it may be useful to employ a monitor that periodically locates the position of the members of the array. One suitable device for doing this is a CCD or CMOS imaging device which, when the output optical fibers are illuminated, can record the spatial position of each member in the array. A CCD imaging device is also useful as a light output detector in the normal operation of any of the devices or systems described earlier. If the CCD image plane is made as large as the aperture of the device it can serve as an output detector without regard to the precise locations of the individual members in the array.

As will be understood by those skilled in the art, arrays similar to those shown in FIGS. 8-10 may be used on the input optical fiber side as well as the output. The bi-axial beam steering just described allows any one, or combination, of a large array of inputs to address any one, or combination, of a large array of outputs. Obviously smaller arrays, with any given number of input optical fibers and any given number of output optical fibers/detectors may be used. Accordingly, a very large number of OCM devices, or optical switches, may be designed using the principles of the invention. In summary, a preferred embodiment of the device of the invention may be described as an optical device having an x-z, a y-z, and an x-y plane, and an x-axis orientation, a y-axis orientation, and a z-axis orientation, the device comprising a first input optical fiber extending along a z-axis, and an output comprising an output array of optical fibers. For wavelength selection the device includes a light dispersive element dispersing light in the y-z plane but not the x-z plane, and a beam steering element, the beam steering element being adjustable to steer an output beam from a first position along a y-axis of the device to a second position along the y-axis of the device, and also adjustable to steer an output beam from a first position along an x-axis of the device to a second position along the x-axis of the device. These positions define a set of x-y coordinates in the output array of optical fibers. The elements just recited cooperate to produce a light path from the input optical fiber to the light dispersive element, and to the beam steering element, and a light reflected path to the light dispersive element. Light propagating in the optical device undergoes minimal dispersion in the x-z plane while being dispersed in the y-z plane so that light of a first wavelength reaches a first output optical fiber when the beam steering element is in the first position while light of a second wavelength reaches the first output optical fiber with the beam steering element in the second position.

Reference to minimal dispersion in the preferred embodiments means essentially no dispersion. However, in some geometries the light may be dispersed somewhat in the x-z plane. Dispersion that is not used functionally in the device may be considered to be minimal dispersion.

In concluding the detailed description it is evident that various additional modifications of this invention may occur to those skilled in the art. All deviations from the specific teachings of this specification that basically rely on the principles and their equivalents through which the art has been advanced are properly considered within the scope of the invention as described and claimed.

The invention claimed is:

1. An optical channel monitoring device comprising:
   one or more input ports;
   an array of light detectors;
   a light dispersion element positioned in optical paths of light transmitted to the light detectors and from the input ports; and
   a light reflecting element for reflecting light components from the light dispersion element and back to the light dispersion element, the light reflecting element being configured to rotate about a first axis to select at least one of the light components for output, and about a second axis to select one of the light detectors for the at least one selected light component and to direct the at least one selected light component to the selected light detector.

2. The optical channel monitoring device of claim 1, wherein the first axis is generally orthogonal to the optical paths of the light transmitted to the light detectors and from the input ports, and the amount of rotation of the light reflecting element is controlled to direct said at least one of the light components to one of the light detectors.

3. The optical channel monitoring device of claim 2, wherein said first axis is configured to be tilted about another axis to direct said at least one of the light components to another one of the light detectors.

4. The optical channel monitoring device of claim 1, wherein each of the light detectors is an optical spectrum analyzer.

5. The optical channel monitoring device of claim 4, wherein the light reflecting element is controlled to direct the light components of a common light beam to the same optical spectrum analyzer.

6. The optical channel monitoring device of claim 4, wherein the light reflecting element is controlled to direct the light components of different light beams to different optical spectrum analyzers.

7. A switchable optical filter comprising:
an array of optical ports;
a light dispersion element positioned to receive and disperse an optical signal; and
a reflective beam steering element that is controllable to deflect any portion of the dispersed optical signal to anyone of the optical ports, the reflective beam steering element being configured to rotate about a first axis to select a portion of the dispersed optical signal, and about a second axis to select one of the optical ports for the selected portion of the dispersed optical signal and to direct the selected portion of the dispersed optical signal to the selected optical port.

8. The switchable optical filter of claim 7, wherein the optical ports are coupled to a plurality of input channels and optical signals of the input channels are dispersed by the light dispersion element.

9. The switchable optical filter of claim 8, wherein the optical ports are coupled to a plurality of light detectors, and portions of the optical signals of the different input channels are directed to the optical ports coupled to the light detectors during different time periods.

10. The switchable optical filter of claim 9, wherein, at each of the optical ports coupled to the light detectors, portions of the optical signals of the different input channels received thereat have the same wavelength.

11. The switchable optical filter of claim 9, wherein the number of optical ports coupled to the input channels is less than the number of input channels.

12. The switchable optical filter of claim 7, wherein the reflective beam steering element is controllable to deflect different portions of the dispersed optical signal respectively to different ones of the optical ports, and time periods during which the optical ports receive their corresponding portion of the dispersed optical signal are configurable.

13. The switchable optical filter of claim 12, wherein lengths of the time periods are configured to be different.

14. The switchable optical filter of claim 7, wherein the optical ports are configured for connection with a two-dimensional array of optical fibers.

15. The switchable optical filter of claim 14, wherein the optical ports are closely packed.

16. The switchable optical filter of claim 14, wherein the optical ports are adjacent to at least two other optical ports.

17. The switchable optical filter of claim 14, wherein the two-dimensional array has a generally rectangular shape.

18. The switchable optical filter of claim 14, wherein the optical ports are adjacent to at least three other optical ports.

19. The switchable optical filter of claim 14, wherein the two-dimensional array has a generally hexagonal shape.

20. A method of filtering and switching an optical signal in an M by N optical device having L optical ports, where L is less than M×N, comprising:
transmitting an optical signal of a first channel through an input optical port;
dispersing the optical signal;
rotating a reflective element about a first axis to select a portion of the dispersed optical signal of the first channel to be directed to an output optical port N1; and
rotating the reflective element about a second axis to select the output optical port N1 for the selected portion of the dispersed optical signal of the first channel and to direct the selected portion of the dispersed optical signal of the first channel to the selected output optical port N1.

21. The method of claim 20, further comprising:
transmitting an optical signal of a second channel through the input optical port during a time period that is different from when the optical signal of the first channel is transmitted through the input optical port;
dispersing the optical signal of the second channel;
rotating the reflective element about the first axis to select a portion of the dispersed optical signal of the second channel to be directed to an output optical port N2; and
rotating the reflective element about the second axis to direct the selected portion of the dispersed optical signal of the second channel to the output optical port N2.

22. The method of claim 20, further comprising:
transmitting an optical signal of a second channel through another input optical port;
dispersing the optical signal of the second channel;
rotating the reflective element about the first axis to select a portion of the dispersed optical signal of the second channel to be directed to the output optical port N1; and
rotating the reflective element about the second axis to direct the selected portion of the dispersed optical signal of the second channel to the output optical port N1.
wherein the selected portion of the dispersed optical signal of the second channel is directed to the output optical port N1 during a time period that is different from when the optical signal of the first channel is directed to the output optical port N1.

* * * * *